(12) United States Patent
Heathcote

(10) Patent No.: US 7,735,941 B2
(45) Date of Patent: Jun. 15, 2010

(54) GAMING FURNITURE

(76) Inventor: Brian Sydney Heathcote, 1 Bakers Square, The Green, Fernham, Faringdon, Oxfordshire, SN7 7NT (GB)

( * ) Notice: Subject to any disclaimer, the term of this patent is extended or adjusted under 35 U.S.C. 154(b) by 1189 days.

(21) Appl. No.: 10/540,223

(22) PCT Filed: Dec. 15, 2003

(86) PCT No.: PCT/GB03/05518

§ 371 (c)(1),
(2), (4) Date: Dec. 9, 2005

(87) PCT Pub. No.: WO2004/054672

PCT Pub. Date: Jan. 7, 2004

(65) Prior Publication Data

US 2006/0163980 A1   Jul. 27, 2006

(30) Foreign Application Priority Data

Dec. 18, 2002   (GB) ................................. 0229428.8

(51) Int. Cl.
*A47B 85/00* (2006.01)
(52) U.S. Cl. ...................................................... 312/241
(58) Field of Classification Search ................. 312/241, 312/240, 194, 195, 204, 235.2, 239, 257.1; 297/118, 119, 383
See application file for complete search history.

(56) References Cited

U.S. PATENT DOCUMENTS

| 1,382,393 | A | * | 6/1921 | Smith | ........................... 312/23 |
|---|---|---|---|---|---|
| 2,646,328 | A | * | 7/1953 | Dayton | ........................ 312/289 |
| 2,738,249 | A | * | 3/1956 | Tenenblatt | .................. 312/237 |
| 2,804,122 | A | * | 8/1957 | Baum | ........................... 108/13 |
| 5,409,307 | A | | 4/1995 | Forsythe | |
| 5,547,270 | A | * | 8/1996 | Dang | ......................... 312/194 |

FOREIGN PATENT DOCUMENTS

| EP | 1 219 204 | 7/2002 |
|---|---|---|
| FR | 2 761 867 | 10/1998 |
| GB | 2 172 498 | 9/1986 |
| GB | 2 329 829 | 4/1999 |
| GB | 2 339 529 | 2/2000 |
| GB | 2 351 655 | 1/2002 |
| WO | WO 99/30789 | 6/1999 |

* cited by examiner

*Primary Examiner*—Janet M Wilkens
*Assistant Examiner*—Timothy M Ayres
(74) *Attorney, Agent, or Firm*—Young & Thompson

(57) ABSTRACT

Gaming furniture (10) includes a support structure (12), and an erectable and collapsible support platform arrangement (16). The support structure (12) defines a space (22) in which one or more video-game controllers (62) and/or a corresponding video-game console can be received, and the support platform arrangement (16) supports the or each video-game controller (62). In a first condition, the support platform arrangement (16) is collapsed and received in the space (22) of the support structure (12) for storage. In a second condition, the support platform arrangement (16) is erected and projects beyond the perimeter of the support structure (12) for gaming.

11 Claims, 9 Drawing Sheets

GAMING FURNITURE

This invention relates to gaming furniture.

Video-game consoles are extremely popular. They typically comprise a console unit which can be plugged into a television set, and one or more controllers for controlling the action of a game. The video-game controller takes a number of forms, mainly dependent on the type of game to be controlled. These forms include, amongst others, a simple hand-held keypad-type controller, a steering-wheel-type controller with separate foot controller, a joystick-type controller, and a gun-type controller.

An assortment of other accessories are also available to complement the consoles, along with numerous video-games which are provided in their own separate boxes.

The problem with having so many individual items is that storage in a single location is frequently difficult and, furthermore, storing tidily so that the appearance of a room is not spoilt takes time and perseverance and, even then, is often not satisfactory. Other furniture, not necessarily designed to house video-game consoles and controllers, is also often monopolised and thus rendered less, or un-, usable for the originally intended function.

A further problem is apparent when arranging the console and controller(s) for use. Leads have to be connected between the console and the television set, the controllers have to be connected to the console and, where appropriate, suitably mounted on rigid or substantially rigid surfaces. The power supply also has to be connected, and the game to be played has to be located and organised. This not only takes time, but is inconvenient and results in numerous cables and cords criss-crossing the room.

The present invention seeks to provide a solution to this problem.

According to a first aspect of the present invention, there is provided gaming furniture comprising a support structure, and an erectable and collapsible support platform arrangement, the support structure defining a space in which one or more video-game controllers and/or a corresponding video-game console can be received, and the support platform arrangement supporting the or each video-game controller; in a first condition, the support platform arrangement being collapsed and received in the said space of the support structure for storage and, in a second condition, the support platform arrangement being erected and projecting beyond the perimeter of the support structure for gaming.

According to a second aspect of the invention, there is provided gaming furniture comprising a support structure, a support element, and an erectable and collapsible support platform arrangement, the support structure defining a space in which one or more video-game controllers and/or a corresponding video-game console can be received, the support element extending across the said space in a first condition of the gaming furniture and a second condition of the gaming furniture, and the support platform arrangement supporting the or each video-game controller; in the said first condition, the support platform arrangement being collapsed and received in the said space of the support structure for storage and, in the said second condition, the support platform arrangement being erected and projecting beyond the perimeter of the support element for gaming.

According to a third aspect of the invention, there is provided gaming furniture comprising a support structure, and an erectable and collapsible support platform arrangement, the support structure defining a space in which one or more video-game controllers and/or a corresponding video-game console can be received, and the support platform arrangement supporting the or each video-game controller; in a first condition, the support platform arrangement being collapsed and received in the said space of the support structure for storage and, in a second condition, the support platform arrangement being erected and projecting beyond the said space of the support structure for gaming.

The invention will now be described, by way of example, with reference to the accompanying drawings, wherein.

Referring firstly to FIGS. 1 to 8 of the drawings, a first embodiment of gaming furniture 10 is shown which comprises a container 12, being in this case in the form of a wooden chest, a removable support element or lid (not shown), and a support platform arrangement 16.

Figure 1:
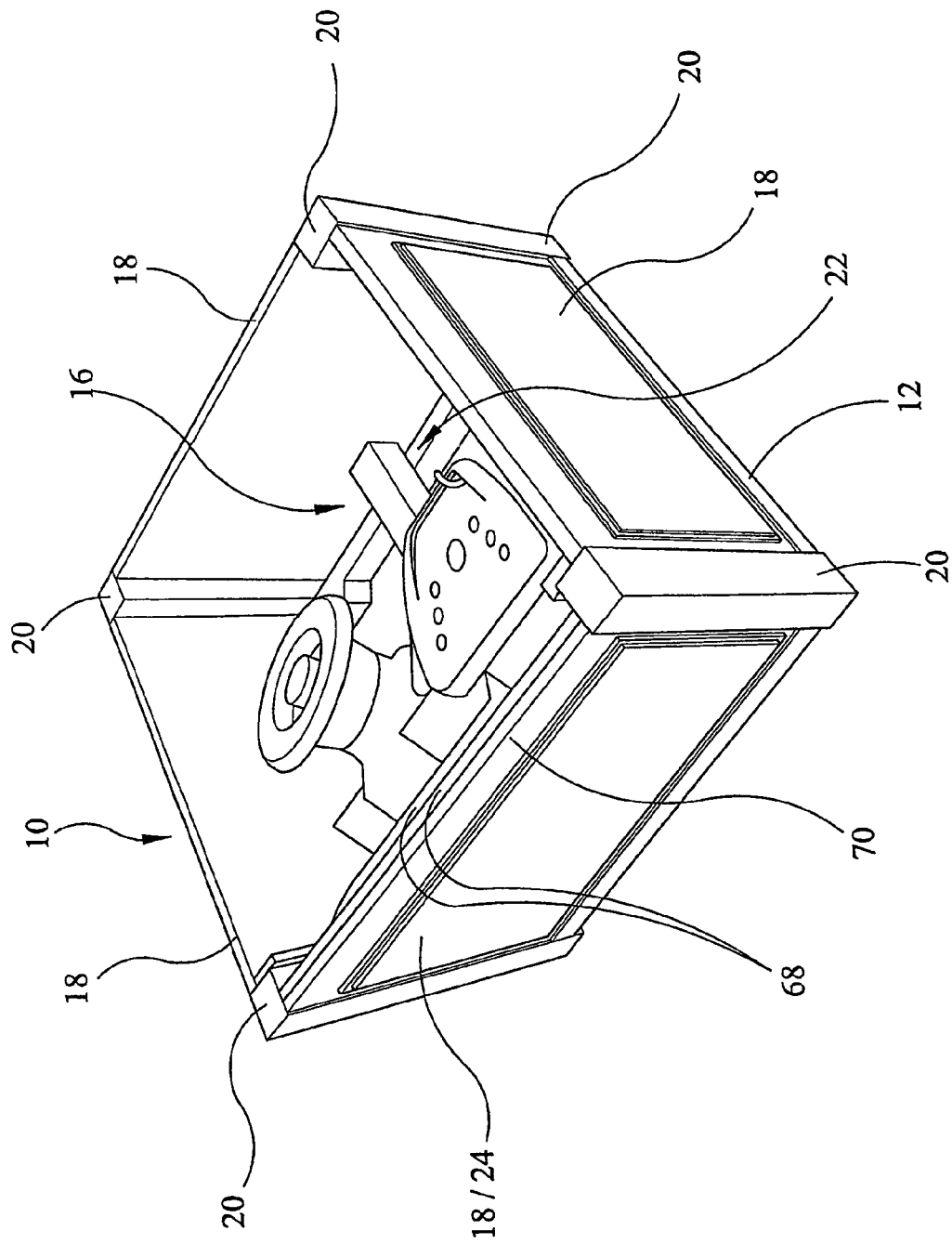
FIG. 1 is a perspective view showing part of a first embodiment of gaming furniture, in a first condition and in accordance with the present invention.
Figure 2:
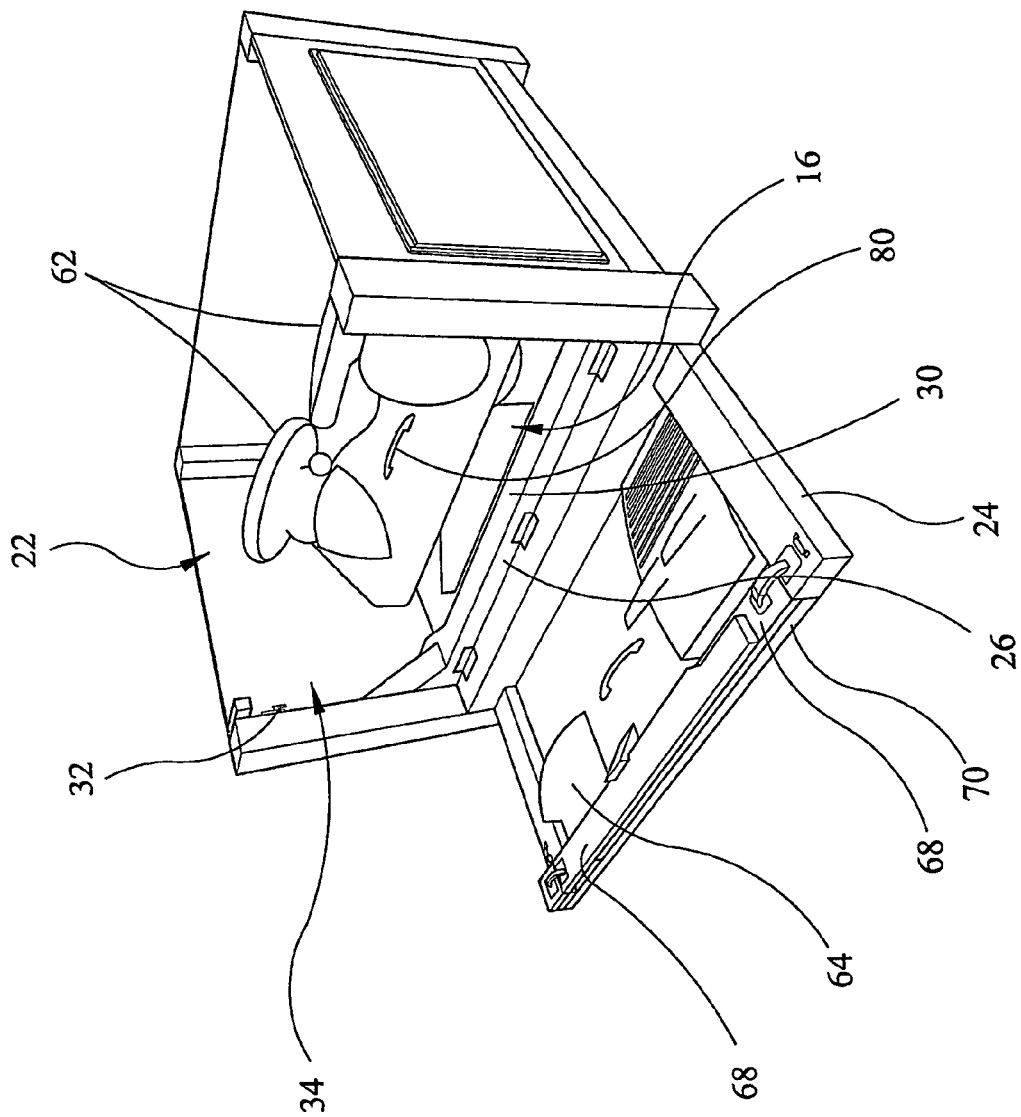
FIG. 2 is a perspective view of the gaming furniture shown in a first stage between a first and second condition.
Figure 3:
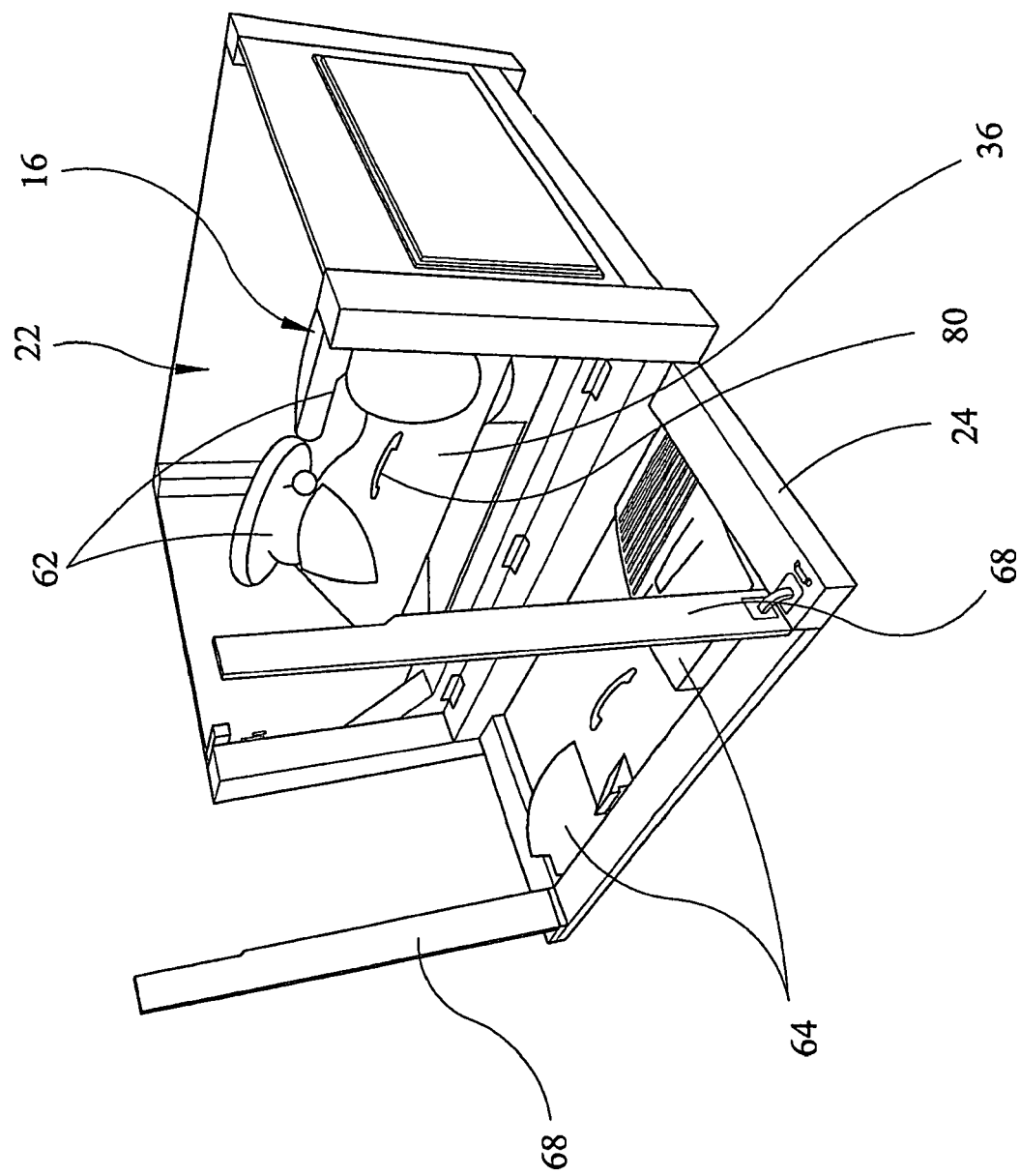
FIG. 3 is a perspective view of the gaming furniture shown in a second stage between the first and second condition.
Figure 4:
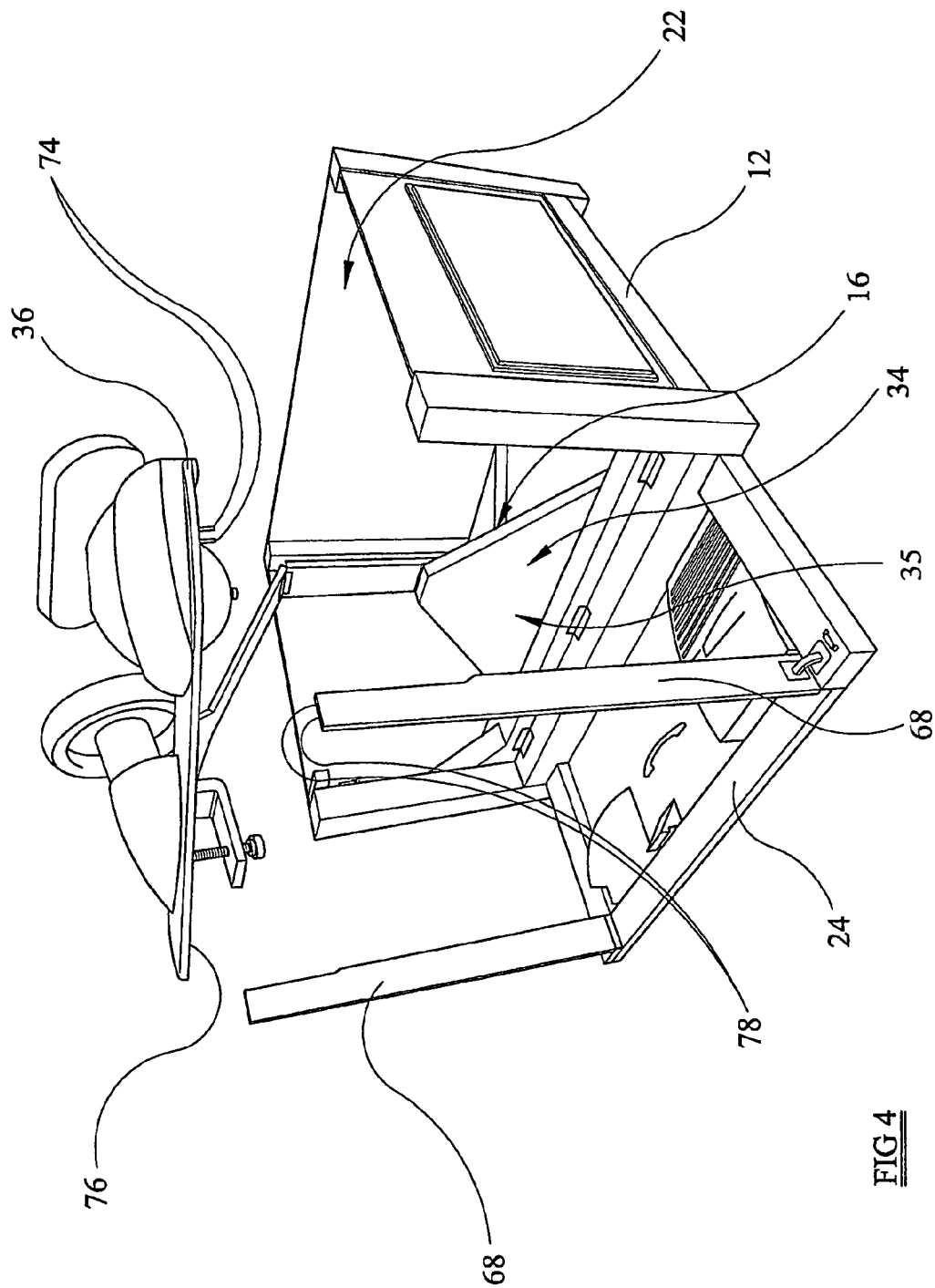
FIG. 4 is a perspective view of the gaming furniture shown in a third stage between the first and second condition.
Figure 5:
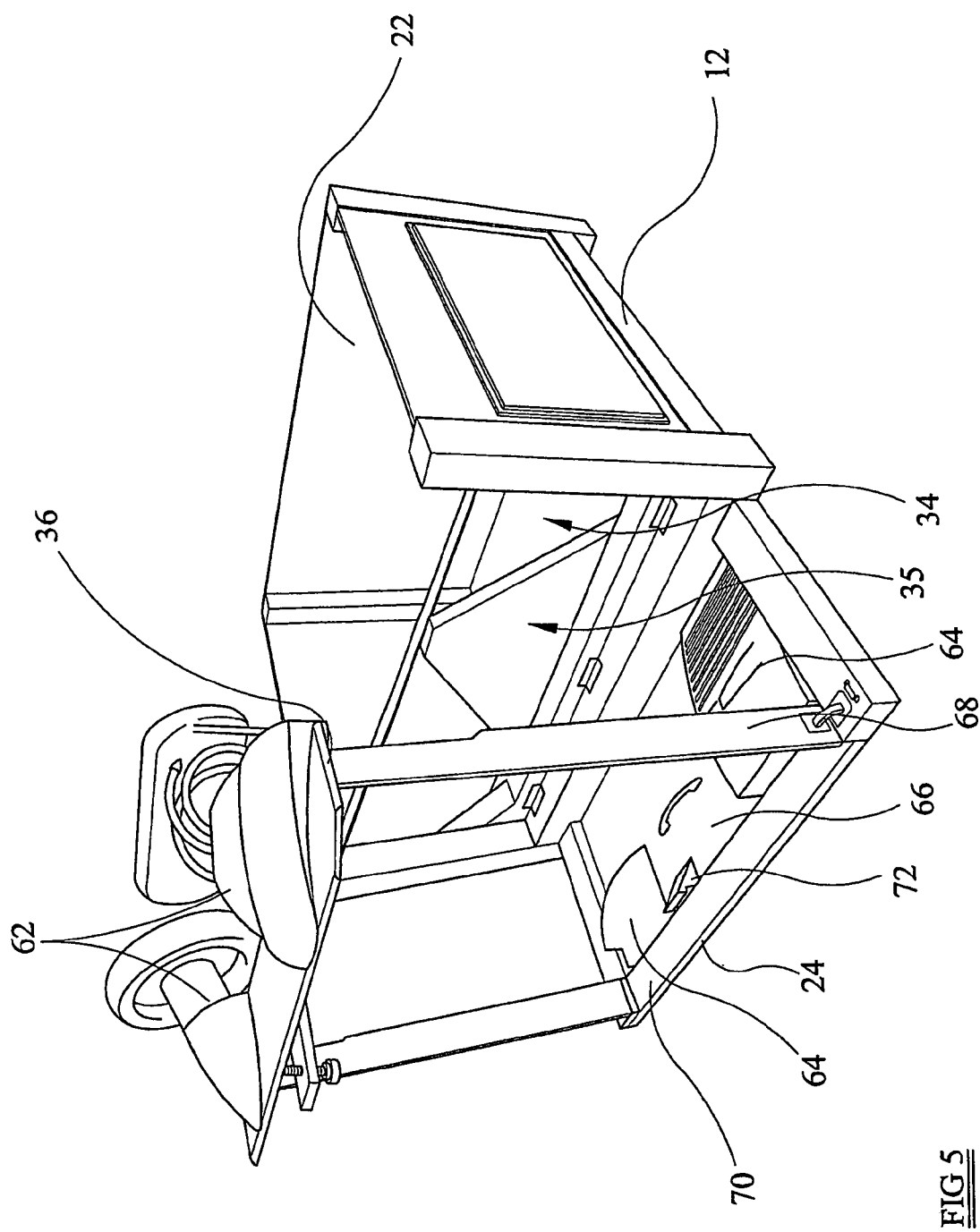
FIG. 5 is a perspective view of the gaming furniture in the second condition.

The container 12 has four sides 18 which extend between four vertical corner posts 20. The corner posts 20 and sides 18 define an interior space 22, when arranged contiguously as shown in FIG. 1. One of the sides 24 is pivotably hinged along an interior bottom edge 26 adjacent to the front face 28 of a bottom front longitudinal strut 30. Twistable catches 32, or any other suitable catch or latch means, are used to retain the foldable side 24 when in a folded up, or closed, position. The foldable side 24 is thus outwardly and downwardly pivotable to provide an opening 34 into the interior space 22 of the container 12, as shown in FIG. 2.

The lid is dimensioned to be supportable on the four sides 18 and/or corner posts 20 to cover the said interior space 22, and close the container 12 when the foldable side 24 is in the closed position. The lid has a first surface which is planar or substantially planar, and an opposite second surface which incorporates shallow profiled seating. The lid is invertable depending on which surface is required to be facing upwardly.

The support platform arrangement 16 is fully receivable and storable in the said interior space 22 of the container 12, and comprises an extendable and retractable articulated arm mechanism 35 and a support platform 36.

Figure 6:
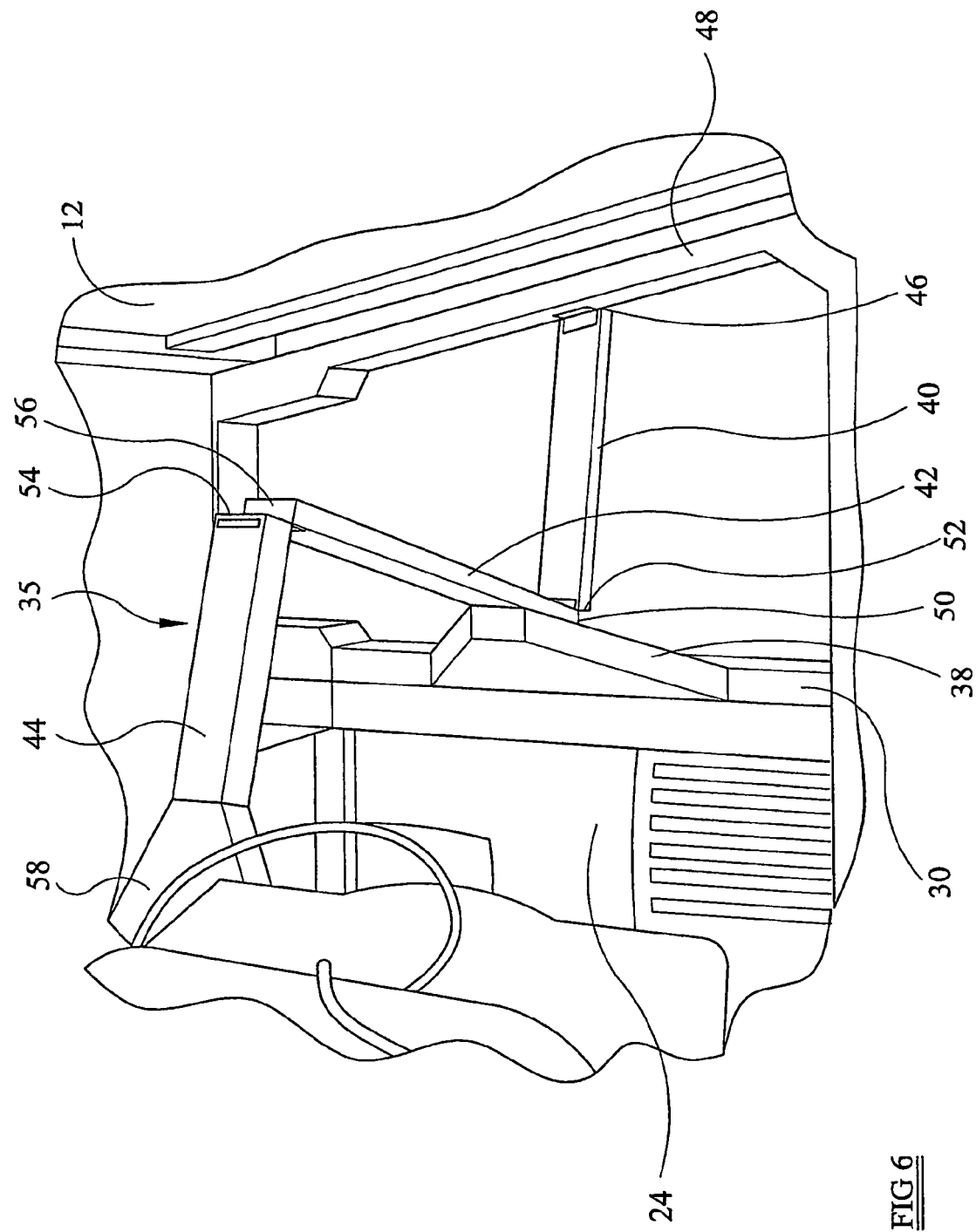
FIG. 6 is a perspective view of an articulated arm mechanism of the gaming furniture in a part-extended condition.
Figure 7:
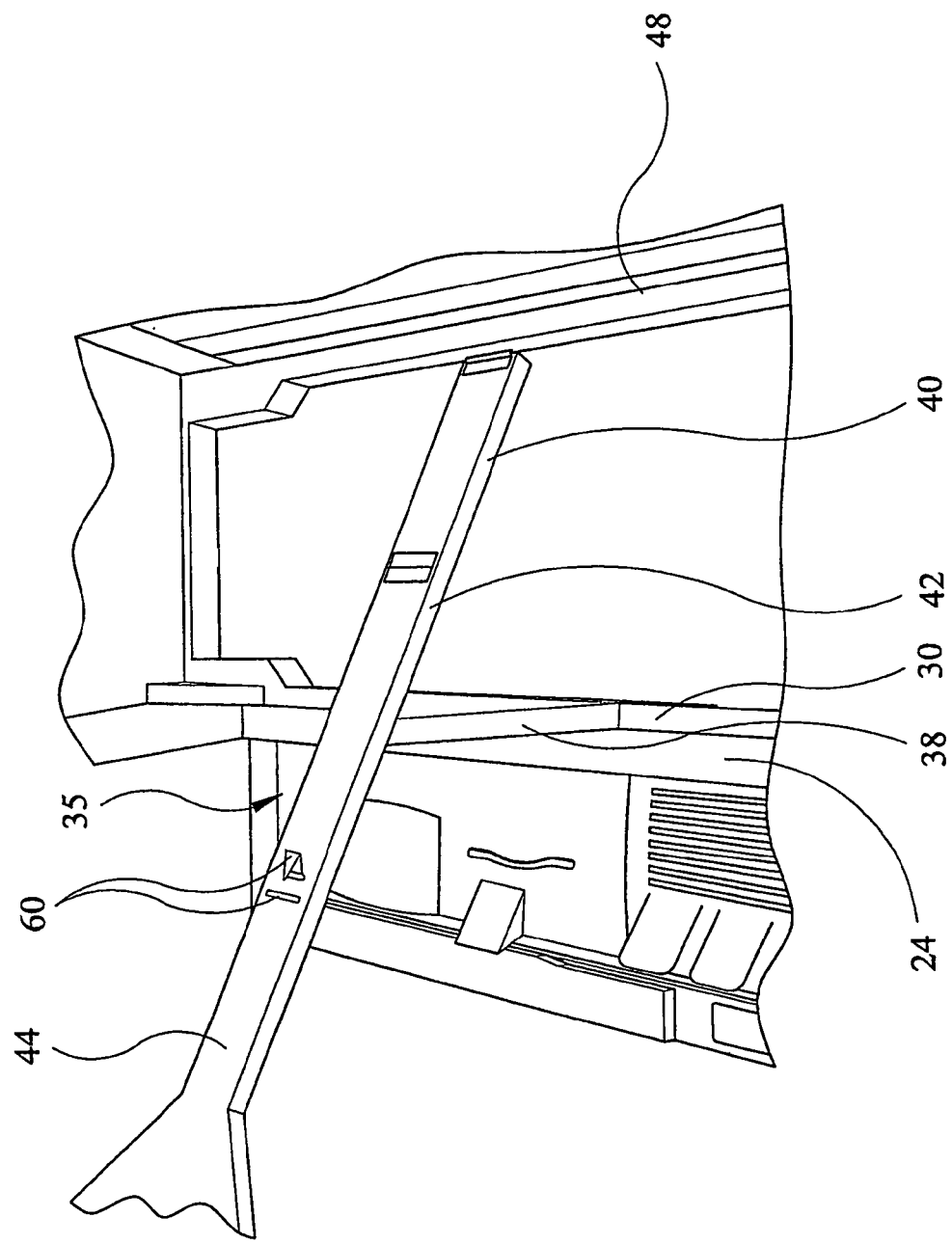
FIG. 7 is a perspective view of the articulated arm mechanism of the gaming furniture in a fully extended condition.
Figure 8:
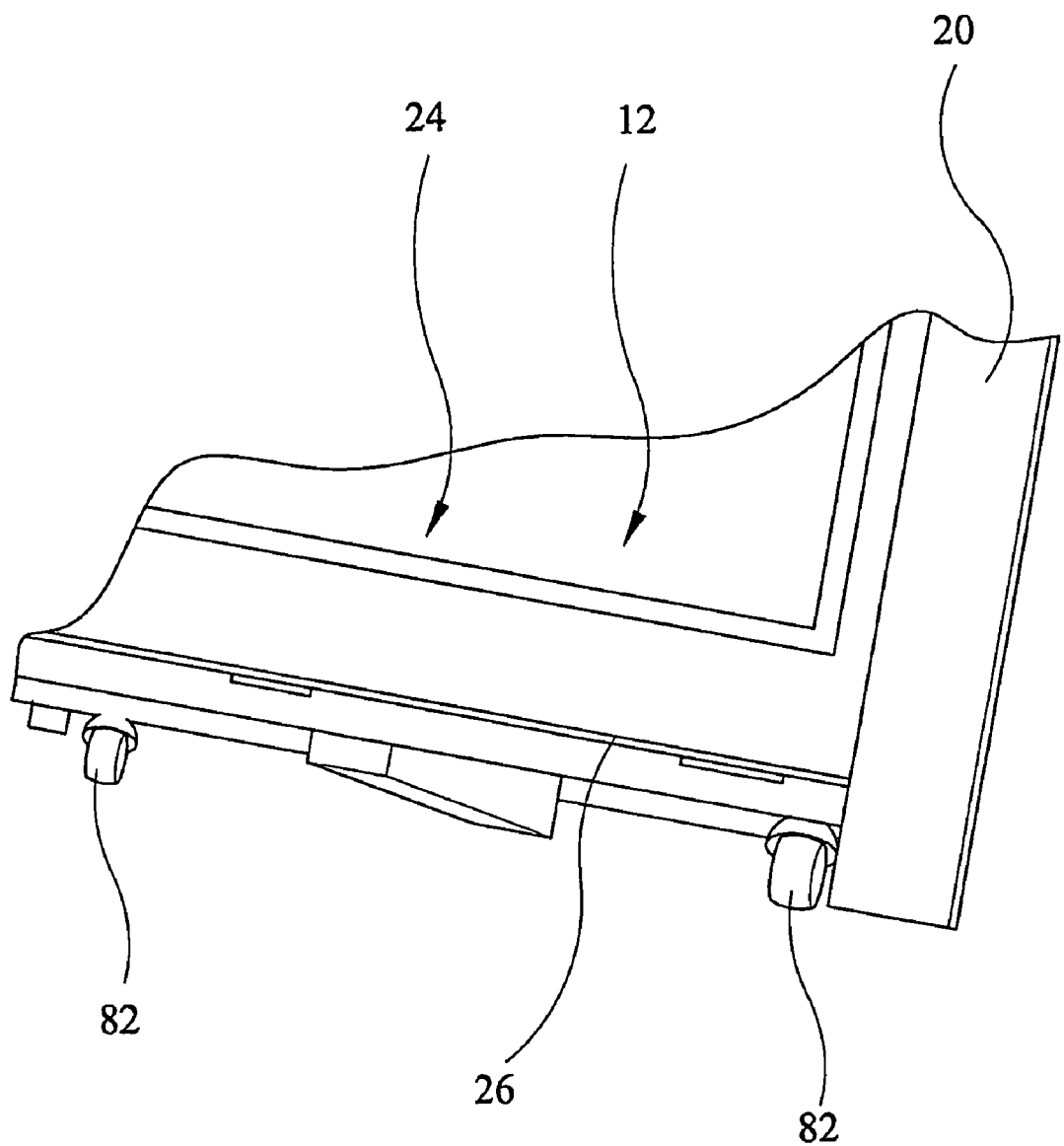
FIG. 8 is a perspective view showing the arrangement of castors of the gaming furniture.

The articulated arm mechanism 35, as best seen in FIGS. 6 and 7, has a base portion 38 pivotably hinged to the bottom front longitudinal strut 30 of the container 12 at a position adjacent to, and midway along, the bottom edge of the foldable side 24, and first, second and third arm portions 40, 42 and 44. The first end 46 of the first arm portion 40 is pivotably hinged to a bottom rear longitudinal strut 48 which extends in spaced parallel relationship with, and in the same or substantially the same horizontal plane as, the bottom front longitudinal strut 30. The first end 50 of the second arm portion 42 is pivotably hinged to the second end 52 of the first arm portion 40 opposite the first end 46. The second arm portion 42 is also pivotable hinged, part way therealong, to the base portion 38. The first end 54 of the third arm portion 44 is pivotably hinged to the second end 56 of the second arm portion 42 opposite the first end 50, and the support platform 36 is fixedly mounted to the second end 58 of the third arm portion 44.

The first, second and third arm portions 40, 42 and 44, and the base portion 38, are pivoted relative to each other to form an articulated concertina arrangement. A releasable locking device 60 is provided at each hinged joint between the arm portions 40, 42 and 44 to prevent the articulated arm mechanism 35 from collapsing once extended.

In the extended state, due to the spaced arrangement of the front and rear longitudinal struts 30 and 48, the articulated arm mechanism 35 projects at an angle out of the container 12, through the said opening 34 provided by the foldable side 24 when folded down.

The support platform 36 is adapted to releasably and securely support two video-game controllers 62 oriented for use in the direction of the container 12. Specifically, the video-game controllers 62 are steering-wheel-type controllers, as shown in the drawings. In this case, the foldable side 24 of the container 12 releasably and securely supports the associated foot pedal controllers 64 on its interior facing surface 66.

Alternatively or additionally, the support platform 36 could releasably and securely support keypad controllers, joystick controllers, or combinations of controllers. The support platform 36 can also support just a single video-game controller.

The interior space 22 of the container 12 is of sufficient size to entirely receive the support platform 36 with the controllers mounted thereon.

The support platform 36 is mounted to the end of the third arm portion 44 of the articulated arm mechanism 35 so that, when the articulated arm mechanism 35 is fully extended, the support platform 36 is horizontal or substantially horizontal.

The support platform arrangement 16 also includes a pair of leg members 68 pivotably hinged at one end to the said foldable side 24 of the container 12. When the foldable side 24 is in the closed position, the leg members 68 are received flat to lie in parallel with the upper edge 70 of the foldable side 24. A latch device 72 retains the leg members 68 in this position until released.

When the foldable side 24 is folded flat, the leg members 68 are released from the latch device 72 and are unfolded and raised to an upstanding position. The support platform 36 can then be supported thereon. To provide positive engagement between the leg members 68 and the support platform 36, lugs 74 (see FIG. 4) are formed in the bottom surface 76 of the support platform 36 and complementary recesses 78 are formed in the free-ends of the leg members 68.

The support platform 36 may include a handle or grip 80, typically provided on the support platform 36, to aid extraction and storage of the support platform arrangement 16.

Swivelable castors 82 are provided at, or adjacent to, the corners of the container 12 for ease of movement of the gaming furniture 10. However, to provide low resistance to unintended motion of the gaming furniture 10, the corner posts 20 extend to, or substantially to, the horizontal plane of the bottom of the castors 82.

In use, the gaming furniture 10 takes a first storage condition when the support platform arrangement 16 is collapsed and fully received in the interior space 22 of the container 12, the foldable side 24 is folded up and latched, and the lid is supported on the container 12 with the first surface facing upwards. In this condition, the gaming furniture 10 can be used as coffee table or utility chest.

When it is desired to use the video-game console, the lid is removed, the foldable side 24 is unlatched and folded flat to the floor on which the gaming furniture 10 is positioned, and the support platform arrangement 16 is unfolded and erected from the interior of the container 12. The leg members 68 are released and unfolded to an upstanding position, the articulated arm mechanism 35 is extended from its concertina folded arrangement, and the support platform 36 is engaged with the leg members 68 via the lugs 74 and recesses 78. The first, second and third arm portions 40, 42 and 44 are then locked relative to each other via the locking devices 60, and the lid is inversely replaced on the container 12 so that the seating on the second surface faces upwards.

In this second gaming condition, and due to the dimensions of the articulated arm mechanism 35, the support platform 36 is positioned above the horizontal plane of the lid and projects beyond the perimeter of the lid.

Furthermore, due to the positioning of the leg members 68 on the foldable side 24, the support platform 36, when engaged with the leg members 68, also extends beyond the upper edge 70 of the foldable side 24.

One or more users can thus sit on the seating of the inverted lid, and use the video-game controllers 62 stably and rigidly supported on the support platform 36 and the foldable side 24 of the container 12.

The foldable side 24, by being folded to lie flat on the floor, also aids in stabilising the gaming furniture during use.

To return the gaming furniture 10 to the first storage condition, the above described process is simply repeated in reverse.

The use of castors 82 allows the gaming furniture 10 to be moved. However, particularly on carpet, the downwardly extending corner posts 20 prevent or inhibit unintentional movement. This is especially advantageous during use of the gaming furniture 10, when the gaming furniture 10 is in the second gaming condition and subject to movement during play.

Although not shown, the interior space 22 of the container 12 is of sufficient size to house the video-game console. This enables the controllers 62 to remain attached to the console, and thus only requires connection of one trailing cable to the television set and one cable to the power supply.

Storage compartments may also be provided in the interior space 22 of the container 12 for receiving various accessories and game boxes.

In a modification to the first embodiment, the first and second surfaces of the lid could both be planar or substantially planar. In this case, the seating for a user or users is simply the upwardly facing surface of the lid. The lid can thus be hinged to one side of the container 12 and need not be invertable.

Figure 9:
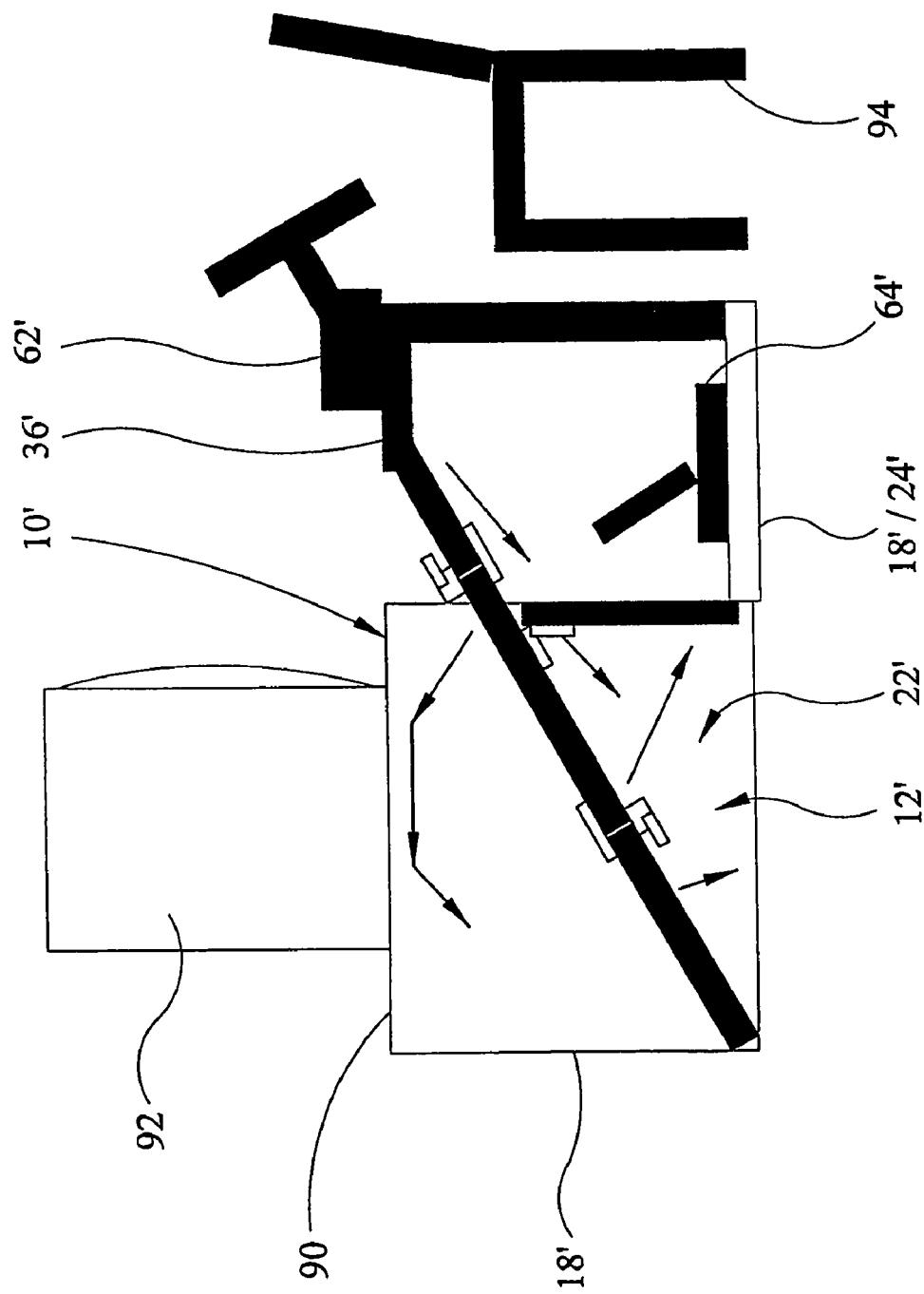
FIG. 9 is a diagrammatic side view of a second embodiment of gaming furniture, in the second condition and in accordance with the present invention.

Referring now to FIG. 9, a second embodiment of gaming furniture 10' is shown. Similar references refer to parts similar to those described in the first embodiment, and further description will thus be omitted.

In this embodiment, the gaming furniture 10' is in the form of a television stand or unit. In this case, the support element is simply a cover 90 which covers the said space 22' of the container 12', and it may be fixed in place to the container 12'. A television set 92 is supportable on the cover 90.

The support platform 36' supports the video-game controllers 62' in an opposite orientation to that of the first embodiment, so that they face away from the container 12'. The sides 18' of the container 12' may also be higher to raise the level of the supported television set 92. In this case, the support platform 36' may lie in, or substantially in, the same plane as the cover 90. However, the support platform 36', in the second condition, still projects beyond the perimeter of the cover 90.

Unlike the first embodiment, the gaming furniture 10' of the second embodiment has no integral seating. Therefore, independent seating, such as chairs 94, are typically placed adjacent to the support platform 36' when it is desired to use the video-game controllers 62'.

The gaming furniture 10' of the second embodiment can assume the first and second conditions as described in the first embodiment.

This embodiment has the advantage that the only possible trailing cable is that of the power cord.

In a modification to both embodiments, the support platform, instead of being rigidly fixed relative to the third arm portion of the articulated arm mechanism, could be independently pivotable to take up any suitable position.

Although the gaming furniture is described as utilising a container, in fact any suitable type of support structure could be used which defines the said space for receiving and storing the support platform arrangement. For example, in the case where the gaming furniture is a table or desk, the support structure may be a frame with limited, or no, sides. In this case, the foldable side may be dispensed with.

The gaming furniture can be formed from any suitable material, such as wood, metal, plastics, or combinations thereof.

The gaming furniture is intended for use with video-game consoles, such as Playstation™, Playstation2™, Xbox™, and/or GameCube™ consoles, games and accessories. The gaming furniture may be sized to accommodate one, or combinations of, video-game consoles, games and accessories.

Although the support platform arrangement is pivotally connected to the support structure by way of hinges, it could be slidable relative to the support structure or be attached in any other suitable manner. It could equally be free-standing and not attached to the support structure.

It is thus possible to provide gaming furniture which, in a first condition, stores neatly and tidily one or more video-game consoles, games and accessories, and forms a common item of household furniture; and, in a second condition, is opened to form a game playing arrangement. It is also possible to provide gaming furniture which reduces the number of cables and cords running between the console, television set and power socket.

The embodiments described above are given by way of examples only, and other modifications will be apparent to persons skilled in the art without departing from the scope of the invention as defined by the appended claims. For example, the video-game console and/or the games and accessories could be housed separately of the gaming furniture; and the support platform could additionally be adapted to support other items, such as drink and food containers.

The invention claimed is:

1. Gaming furniture, comprising:

a container having sides and a top support element which define an interior space for receiving at least one video-game controller; and an erectable and collapsible support platform arrangement having a support platform which is separate of the container sides and top support element for supporting the at least one video-game controller, the support platform arrangement being connected to said container and being fully receivable within said interior space and foldable to project out of the container, one of said container sides being pivotally connected to another portion of the container and being outwardly and downwardly pivotable to provide a closable opening through which the support platform arrangement can be unfolded to project from the container, and the unfolded support platform arrangement being further supported by a foldable leg member connected to said one of said container sides and extending between said one of the container sides and the support platform arrangement.

2. Gaming furniture as claimed in claim 1, wherein the support platform arrangement is foldable into and out of the container.

3. Gaming furniture as claimed in claim 1, wherein the support platform arrangement is hingably attached to a base of the container.

4. Gaming furniture as claimed in claim 1, wherein the said foldable side of the container is adapted to releasably support a further video-game controller.

5. Gaming furniture as claimed in claim 1, wherein the support platform arrangement includes an extendable and retractable articulated arm mechanism and a support platform attached to the end of the articulated arm mechanism, the support platform supporting the at least one video-game controller.

6. Gaming furniture as claimed in claim 5, wherein the articulated arm mechanism is lockable when extended.

7. Gaming furniture as claimed in claim 1, wherein the support platform arrangement, when erected, projects above the horizontal plane of the top support element.

8. Gaming furniture as claimed in claim 1, wherein the support element is an openable lid.

9. Gaming furniture as claimed in claim 1, wherein the top support element functions as seating when the support platform arrangement is erected.

10. Gaming furniture as claimed in claim 9, wherein the top support element is invertable to act as seating.

11. Gaming furniture as claimed in claim 1, wherein the top support element is fixedly mounted as part of the container.

\* \* \* \* \*